United States Patent [19]
Casey

[11] Patent Number: 6,015,517
[45] Date of Patent: Jan. 18, 2000

[54] CONTROLLED POROSITY FOR CERAMIC CONTACT SHEETS AND SETTER TILES

[75] Inventor: Jon A. Casey, Poughkeepsie, N.Y.

[73] Assignee: International Business Machines Corporation, Armonk, N.Y.

[21] Appl. No.: 09/057,306

[22] Filed: Apr. 8, 1998

[51] Int. Cl.[7] ..................................................... B29C 65/00
[52] U.S. Cl. ................................. 264/44; 419/2; 427/226
[58] Field of Search ................................. 264/44; 419/2; 427/226

[56] References Cited

U.S. PATENT DOCUMENTS

| | | | |
|---|---|---|---|
| 1,941,804 | 1/1934 | Kern | 264/44 |
| 2,360,929 | 10/1944 | Blaha | 264/44 |
| 4,083,905 | 4/1978 | Insley et al. | 264/44 |
| 4,191,721 | 3/1980 | Pasco et al. | 264/44 |
| 4,246,215 | 1/1981 | Pasco et al. | 264/44 |
| 4,680,153 | 7/1987 | Kinder et al. | 264/44 |
| 4,777,153 | 10/1988 | Sonuparlak et al. | 264/44 |
| 5,045,511 | 9/1991 | Bosomworth et al. | 264/44 |
| 5,171,721 | 12/1992 | Nanataki et al. | 264/44 |
| 5,563,212 | 10/1996 | Dismukes et al. | 264/44 |

OTHER PUBLICATIONS

Ceramic Bulletin, *"Assessment of Porous Ceramic Materials for Hot Gas Filtration Applications"*, vol. 70, No. 9, pp. 1491–1498 (1991).
Key Engineering Materials, *"Tape Casting of Flat Ceramic Membranes"*, vols. 61 & 61, pp. 425–428 (1991).
Polymer Journal, *"Microporous Ceramic Membranes"*, vol. 23, No. 5, pp. 407–415 (1991).

*Primary Examiner*—Christopher A. Fiorilla
*Attorney, Agent, or Firm*—DeLio & Peterson, LLC; Robert Curcio; Aziz M. Ahsan

[57] ABSTRACT

A ceramic contact sheet and setter tile with controlled porosity is introduced, along with the method for making the same. The amount of porosity is controlled by the volume percentage, particle size, and particle shape of a fugitive phase which can be added to the original refractory material slurry used to fabricate setter tiles and contact sheets. The fugitive phase can be used independently to introduce porosity in setter tiles and contact sheets or in conjunction with partial densification. Since porosity is not solely dependent upon partial sintering, higher porosity levels can be achieved with less impact on subsequent mechanical properties of the resultant refractory material.

20 Claims, No Drawings

CONTROLLED POROSITY FOR CERAMIC CONTACT SHEETS AND SETTER TILES

BACKGROUND OF THE INVENTION

1. Field of the Invention

The present invention relates to refractory ceramic and metal materials and their method of manufacture, for use in filtering and sintering applications, and more specifically, for a method of controlling porosity in these materials.

2. Description of Related Art

High temperature gas phase exchange reactions are critical to the success of numerous technologies. For example, in the sintering of ceramic articles which contain volatile organic compounds, e.g., binders and plasticizers, the volatile organics must be thermally removed prior to the densification of the ceramic body. The binders and plasticizers added to the ceramic slurry are chosen so that they depolymerize into volatile hydrocarbons and carbonaceous residues upon heating to a particular temperature. This process, referred to as binder burnout, typically involves a polymer pyrolysis process and a carbon (char) oxidation process. The success of the binder burnout process is dependent upon the exchange of product and reactant gasses to and from the ceramic, and also within the ceramic itself. Binder removal can be a relatively simple process when conducted in a high oxygen content ambient environment, and when high gas exchange conditions are possible. However, under certain circumstances it may be necessary to perform the binder removal process under lower oxygen partial pressures, e.g., during co-sintering of ceramics and metals, or when it is necessary to fully or partially enclose the ceramic, thus reducing the gas exchange into and out of the ceramic. Under such conditions, the control of the product and reactant gas species to and from the ceramic body becomes critical.

The use of porous sintering fixtures, e.g., setter tiles, boxes, covers, and porous contact sheets, can greatly improve the kinetics of the gas exchange reactions. For ample gas exchange through porous fixtures, the fixtures should contain a high volume fraction of contiguous pores. The porous sintering fixtures allow for the exchange of product and reactant gas species into and out of ceramic bodies such as multilayer alumina, aluminum nitride, or glass ceramic substrates during the binder removal process. The more porous the sintering fixtures are, the better the gas species can diffuse through them to the actual substrate. The same is true for the contact sheets which may be applied to the surface of the multilayer ceramic substrate.

Important features pertaining to the porous material include total pore volume, pore size, connectivity of the pores, tortuousness of the porous network, and pore channel uniformity. In addition to the pore structure, since sintering of ceramics typically occurs at high temperatures, usually greater than 800° C., the porous sintering fixtures must be able to withstand an extreme thermal environment without significant degradation in their mechanical properties or structure. Porous refractory materials, i.e., thermally stable materials, such as porous ceramics and metals, are typically used as sintering fixtures for these applications. Another common usage of this porous material is for filtering gases from the ambient.

However, introduction of pores in a ceramic material generally causes a decrease in strength of the resulting ceramic body. It has been observed that the decrease in strength of porous ceramic materials is exponential with porosity content. Yet, for porous ceramic and metal materials to be successfully utilized as sintering fixture materials or filter materials that enhance the high temperature gas exchanges, the porous materials must have a high volume fraction of contiguous pores with uniform pore geometry. With respect to filter materials, modulus of rupture or bend strength, thermal shock resistance, thermal expansion, modulus of elasticity, fracture toughness, thermal conductivity, hardness, density, and potential chemical reactivity are important criteria in the selection of a viable, durable filter. Although many of these material properties are available for dense ceramics, these ceramics have not been generated under conditions that control and regulate the porosity of the refractory ceramic or metal material.

Producing a durable, porous material with repeatable accuracy would enable the implementation of a consistent binder removal process during substrate production without concern for the variations in high temperature gas exchange kinetics that would otherwise result from the small differences in the porosity of the ceramic fixtures used in the sintering process. Consequently, it would be beneficial to those practicing in the art to have a process by which a controlled volume of contiguous pores, with a specific pore size, can be introduced into a refractory ceramic or refractory metal material.

In U.S. Pat. No. 4,777,153 issued to Sonuparlak et al., on Oct. 11, 1988, entitled "PROCESS FOR THE PRODUCTION OF POROUS CERAMICS USING DECOMPOSIBLE POLYMERIC MICROSHPERES AND THE RESULTANT PRODUCT", a colloidal suspension of polymeric microspheres of a selected size and shape are consolidated with aluminum oxide particles to form a compact. When the compact is heated, the microspheres are decomposed to leave pores. The resultant structure is then sintered to form a porous ceramic body with a plurality of pores, substantially the same size and shape, that are evenly distributed and noncontiguous throughout the ceramic material. However, this prior art teaches the addition of the polymeric microspheres to introduce noncontiguous (discrete) pores in the ceramic. In order to enhance the gas permeable characteristics of the material the pores must be contiguous (interconnected) to be effective in sintering and/or filtering applications.

A common method to introduce a contiguous pore structure into a ceramic is by partially sintering the ceramic. For aluminum oxide ceramics, this process is usually performed at a temperature of 1000° C. to 1350° C. for 12 to 24 hours after a preliminary heating at a lower temperature for removal of the binder. In the case of setter tiles, the porosity is desirable since it allows the ambient gases to flow through the setter tile and contact the ceramic substrate laminate, thereby rendering more efficient the removal of the binder decomposition products.

In U.S. Pat. No. 5,045,511 issued to Bosomworth et al., on Sep. 3, 1991, entitled "CERAMIC BODIES FORMED FROM YTTRIA STABILIZED ZIRCONIA-ALUMINA", ceramic bodies used in the filtration of molten metal are formed by immersing a porous organic substrate material in an aqueous thixotropic slurry and then thermally removing the organic and sintering the ceramic material. This results in a reticulated ceramic after sintering. However, this prior art neither discloses or suggests the mixing of organic powders with ceramic powders to form a porous ceramic, and then use the controlled porosity of the ceramic specifically for high temperature gas phase reaction control.

In U.S. Pat. No. 5,563,212 issued to Dismukes et al. on Oct. 8, 1996, entitled "SYNTHESIS OF MICROPOROUS CERAMICS", microporous ceramic compositions are prepared by first forming an intimate mixture of a ceramic precursor with additive particles to provide a composite intermediate, followed by pyrolysis of the composite intermediate under an inert atmosphere in sequential stages. Here, in the sintering process the ceramic is initially sintered under reducing conditions, i.e., using only inert ambient conditions. The ability to use oxidizing ambient conditions is neither disclosed or suggested. Also, although the addition of a fugitive phase to produce a porous material is paramount to this prior art, there is no suggestion to control the performance of the material, i.e., pore volume, connectivity of the resulting pores, and most importantly, gas exchange characteristics of the porous ceramic.

The disclosure of all of the above references is incorporated by reference herein.

By controlling the time and temperature used in the sintering process, the amount and connectivity of the pores can be controlled to a certain degree. However, as the time and temperature are increased, the amount of pores and the connectivity of the pores decreases. In addition, since incomplete sintering of the ceramic is necessary to achieve the proper pore structure, in most instances, the resulting porous ceramics have insufficient mechanical properties as a result of poorly sintered ceramic particles in the ceramic network. Also, since the sintering of the ceramic is very sensitive to the initial ceramic particle size, sintering temperature, and hold times, it is difficult to produce a consistent porous ceramic article. This would require the sintering process being interrupted at the same pore volume and pore structure in order to achieve the same final properties of the porous ceramic. Ideally, the introduction of pores into a ceramic or refractory metal material by a method which allows for independent control of pore volume and pore size, with or without the use of partial sintering of the final porous material, would greatly enhance the current state of the art.

Bearing in mind the problems and deficiencies of the prior art, it is therefore an object of the present invention to provide a method for controlling the porosity within ceramic or refractory metal materials used in filtering and gas permeation applications.

It is another object of the present invention to provide a durable porous material with repeatable accuracy.

A further object of the present invention is to provide a porous material having a high volume fraction of contiguous pores with uniform pore geometry.

Yet another object of the present invention is to greatly improve the kinetics of the gas exchange reactions.

Another object of the present invention is to provide a method for controlling porosity of a gas permeable material during the thermal decomposition of the fugitive phase.

Still other advantages of the invention will in part be obvious and will in part be apparent from the specification.

SUMMARY OF THE INVENTION

The above and other advantages, which will be apparent to one of skill in the art, are achieved in the present invention which is directed to, in a first aspect, a method for controlling porosity in a gas permeable material comprising: providing a refractory material slurry; selecting a fugitive phase material having predetermined volume percentage of the refractory material slurry, wherein the fugitive phase material can be removed during thermal processing; combining the fugitive phase material with the slurry; processing the combined slurry into a resultant refractory body; and, controlling porosity of the resultant refractory body by adding heat for a predetermined period of time, thermally removing a predetermined portion of the fugitive phase material, less than the predetermined volume percentage, from the refractory body, such that a portion of the fugitive phase material remains, to form a contiguous porous network with porosity approximately equal to the volume percentage of the removed portion of the fugitive phase material.

The fugitive phase material may be selected in a powder form that further comprises a predetermined particle size, particle morphology, and particle loading. The fugitive phase material may also be comprised of a polymer, a cellulosic material, or a carbon black material. The refractory material may comprise a refractory ceramic or refractory metal material. The refractory material may also be in powder form, and include a polymeric binder material, a solvent, and a plasticizer. Aluminum oxide may be added to the combined slurry.

Further control of porosity can be achieved by adding heat for a predetermined period of time, during sintering of the refractory body, such that the sintering is performed in an atmosphere which is oxidizing with respect to the fugitive phase material.

Sintering the refractory body, comprises: heating at a temperature less than or equal to 500° C. in order to achieve pyrolysis; heating at a temperature greater than or equal to 800° C. and less than or equal to 1100° C., such that the binder and the predetermined portion of the fugitive phase material are burned out of the refractory body; and, heating at a temperature at approximately 1200° C. to perform partial densification of the refractory body, or at approximately 1500° C. to perform complete densification of the refractory body, about the porous network voided by the burned out fugitive phase material.

The aforementioned method may also be used to form a gas permeable contact sheet by applying a ceramic substrate with the fugitive phase combined slurry, a setter tile used in a sintering process, or a filter for use in high temperature applications.

The present invention is directed to, in a second aspect, a method for controlling porosity in a gas permeable material comprising: providing a refractory ceramic or refractory metal material in powder form; selecting a carbon black material in powder form as a fugitive phase having a predetermined volume percentage of the refractory material; combining the carbon black material, a binder material, a plasticizer, and a solvent to the refractory material to form a slurry; processing the slurry to form a resulting refractory body; and, controlling porosity of the resulting refractory body by performing thermal cycling, comprising:

providing an oxidizing atmosphere with respect to the carbon black;

heating at a temperature less than or equal to 50° C. for a first predetermined period of time in order to achieve pyrolysis;

heating at a temperature greater than or equal to 800° C. and less than or equal to 1100° C. for a second predetermined period of time, such that the binder material and a predetermined portion of the carbon black less than the predetermined volume percentage are thermally removed from the refractory body such that a portion of the carbon black material remains; and, heating in a temperature range of 1200° C. to 1500° C. for a third predetermined period of time such that the refractory body undergoes complete or partial densification, forming a contiguous porous network of refractory material, wherein the volume of the porous network is approximately equal to or greater than the predetermined volume percentage of the carbon black removed, and complete or partial densification of the refractory body.

An apparatus for controlling porosity in a gas permeable material can be fabricated from the above described process.

The present invention is directed to, in a third aspect, an apparatus for enhancing gas kinetics in a sintering process, comprising: a setter tile with a predetermined porosity, comprised of a ceramic or metal refractory material with contiguous connecting pores such that the pores have predetermined volume percentage as a function of fugitive phase material, partially removed from the refractory body such that a portion of the fugitive phase material remains, and partial or complete densification by the sintering process.

DESCRIPTION OF THE PREFERRED EMBODIMENT(S)

The features of the invention believed to be novel and the elements characteristic of the invention are set forth with particularity in the appended claims. The invention itself, however, both as to organization and method of operation, may best be understood by reference to the detailed description which follows.

Aqueous ceramic slurries, containing materials such as alumina-chromia and zirconia-alumina, have been successfully employed in the prior art to form ceramic bodies for use as filters and gas exchangers. Typically, a glass powder composition and other nucleating agents are mixed in a ball mill with a suitable organic binder and solvents to yield a castable slurry. Current setter tiles and contact sheets used for ceramic sintering are typically fabricated using a pure aluminum oxide formulation in the slurry. The particle size of the alumina oxide is tailored such that the material has a minimal sintering during either the initial sintering of the setter tiles or subsequently, during the actual sintering of the ceramic substrate. Thus, porosity has been previously achieved solely by an incomplete densification process. Densification occurs during the sintering process where the refractory material, absent the thermally removed binding material, looses its solid porous structure and becomes more dense. In the case of setter tiles, densification is minimized to achieve the porosity but this occurs at the expense of the strength of the final setter tile, i.e., its mechanical properties are considerably degraded. Contact sheets are also designed to undergo minimal densification during the ceramic substrate sintering process. These porous sheets are applied on the ceramic substrate to provide suitable gas transfer properties. The resultant porosity is governed by the initial packing density of the contact sheet and the actual amount of sintering which occurs.

It has been found that introducing a process for controlling contiguous porosity in refractory materials, ceramic or metal, would result in reliable and repeatable porous materials. As previously stated, these materials are not limited in use to sintering fixtures or contact sheets, and can be used for filtration purposes or other technologies requiring controlled porous structures. However, when used as a sintering fixture or contact sheet in high temperature gas exchange reactions, the controlled porosity and refractory nature of the porous material are key features. To achieve this controlled porosity, fugitive phases are added to the starting ceramic or metal powders used in the fabrication of the porous materials. The nature of the fugitive phase, polymers, cellulosic materials, carbon black, and the like, is not as critical as the particle size and morphology. By careful control of the fugitive phase's particle size, particle morphology, particle loading, and subsequent thermal removal, the final pore volume, pore size, and pore connectivity can be independently controlled during the densification of the porous material.

The fugitive phase's particle size, morphology, and loading all affect the percolation threshold at which the pore structure starts to achieve long range, three dimensional interconnectivity. This interconnectivity is necessary for the bulk gas diffusion through the porous structure while in use, for example, as sintering fixtures. Since the fugitive phase is thermally removed in the sintering of the porous material, the resultant pore structure is formed independent of the sintering process. As such, the composition of the porous material can be tailored at the sintering temperature, where the refractory material (ceramic or metal) can undergo significant densification around the network formed by the fugitive phase.

The fugitive phase may be completely removed by a thermal process prior to the actual start of densification, or a predetermined portion may still be present when the densification starts for the refractory materials. The preferred embodiment is to remove a predetermined portion of the fugitive phase, such that a portion of the fugitive phase remains after thermal cycling prior to the start of densification.

The densification of the refractory materials results in a connected network of refractory material interpenetrated by the fugitive phase (if still present) or connected porosity (if the fugitive phase has been completely removed by thermal processing). In addition, the use of a fugitive phase can be used in conjunction with partial densification to produce even higher levels of porosity in the final porous refractory material.

In order to evaluate this methodology, twenty and thirty volume percent carbon black, preferably Thermax carbon black, was mixed with aluminum oxide, and typically a polymeric binder material, a solvent, and a plasticizer, to form a slurry. The slurry was then processed, cast into green sheets using standard methods known to one skilled in the prior art, to form a resultant refractory body. A third formulation of a three component system of carbon black, aluminum oxide and zirconium oxide was also investigated. This formulation also proved adequate for sustaining a repeatable, controlled porous material.

The twenty and thirty volume percent carbon black were ultimately chosen among the three choices for further testing because they were sufficient to ensure a connected pore structure in the final product. The carbon black was selected for this activity, in part because it is available in powder form with well controlled size distributions and can be easily processed using tape casting methods. Although the carbon black is the preferred fugitive phase, other materials that have well controlled size distributions, and can be easily mixed, preferably in powder form, and processed, i.e., thermally removed, may be utilized in the present invention.

Once combined, the materials are then sintered in an oxidizing ambient with respect to the fugitive phase. For example, sintering of the ceramic laminate is conventionally performed using any of a number of heating profile cycles. In general, the sintering of ceramic and, especially, alumina based MLC packages, is typically performed in three distinct heating phases. The first phase, pyrolysis, breaks down large polymers and volatilizes the shorter chain organics. Pyrolysis is usually performed at a temperature below 500°

C. for about 5 hours. The heating cycle where the pyrolyzed binder, fugitive phase, and remaining organics are burned out of the package (termed binder burnout) is usually performed at a temperature above about 800° C., e.g., 900° C. to 1100° C., for about 2 hours. Sintering is then completed at a temperature between 1250° C. and 1500° C. to establish densification and form the final package.

Two sintering temperatures were compared for this method. A lower temperature of 1200° C. was found to be less preferred in causing complete sintering of the refractory ceramic phases. The resulting microstructure demonstrated a high level of porosity resulting from both partial densification and fugitive phase removal. The second sintering temperature selected was 1500° C. At this temperature, the refractory ceramics used for these evaluations would typically achieve almost full density of approximately 98% or greater. However, when the fugitive phase was added, the final microstructure contained significant levels of connected porosity. Pore size and volume in the resulting porous ceramic closely matched the starting particle size and volume of the carbon black additions. Density data for the aluminum oxide systems with twenty and thirty volume percent additions of carbon black are shown in Table I for the two sintering temperatures:

TABLE I

Percent Theoretical Density of Alumina with Carbon Black.

| Firing Temperature | 20% Carbon Black | 30% Carbon Black |
| --- | --- | --- |
| 1200° C. | 51.8% | 44.0% |
| 1500° C. | 77.2% | 68.4% |

As shown in Table I, the 1200° C. sintered parts have significant porosity levels (% porosity=100−theoretical density) indicative of both partial sintering and fugitive phase removal. The parts sintered at 1500° C. have porosity levels very close to the volume percent of the fugitive phase added to the original system (20 and 30 volume percent). The porosity in the 1500° C. systems are the result of mainly the fugitive phase removal, since at 1500° C. the alumina used in this process would achieve close to the theoretical density (complete densification) without the presence of a fugitive phase.

Thus, by controlling the fugitive phase additive (volume, particle size, and morphology) and controlling the sintering process (partial or complete densification), a gas permeable material with predetermined controlled porosity is achieved. It is also evident, using this methodology, that this durable porous material can be fabricated with repeatable accuracy. Thus, the present invention provides for a sintering tile, contact sheet, ceramic filter, and the like, with a controlled volume fraction of contiguous pores with uniform pore geometry for use in filter and sintering applications that greatly enhances the kinetics of the gas exchange reactions.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for controlling porosity in a gas permeable material comprising:
   providing a refractory material slurry;
   selecting a fugitive phase material having a volume percentage of said refractory material slurry, wherein said fugitive phase material can be removed during thermal processing;
   combining said fugitive phase material with said slurry;
   processing the combined slurry into a resultant refractory body;
   heating for a period of time to thermally remove a portion of said fugitive phase material, less than said volume percentage, from said refractory body; and,
   discontinuing said heating of said resultant refractory body such that a remaining portion of said fugitive phase material remains, to form a contiguous porous network with porosity approximately equal to the volume percentage of the removed portion of said fugitive phase material.

2. The method of claim 1 wherein selecting said fugitive phase further comprises selecting said fugitive phase in a powder form.

3. The method of claim 2 wherein selecting a fugitive phase material further comprises selecting a fugitive phase having a particle size, particle morphology, and particle loading.

4. The method of claim 1 wherein adding heat for a period of time comprises sintering said refractory body in an atmosphere which is oxidizing with respect to said fugitive phase.

5. The method of claim 4 wherein sintering said refractory material comprises performing a partial densification of said refractory material, such that higher levels of porosity result after heating.

6. The method of claim 1 wherein controlling porosity further comprises performing partial or complete densification of said refractory body about said porous network.

7. The method of claim 1 further comprising applying a ceramic substrate with the combined slurry to form a gas permeable contact sheet.

8. The method of claim 1 further comprising forming the combined slurry in the shape of a flat tile such that said tile can be used as a high-temperature application filter or a gas permeable setter tile.

9. The method of claim 1 wherein providing a refractory material slurry further comprises providing a refractory ceramic or refractory metal material.

10. The method of claim 1 wherein providing a refractory material slurry comprises providing a refractory material in powder form, a polymeric binder material, a solvent, and a plasticizer.

11. The method of claim 10 wherein sintering said refractory body comprises:
   heating at a temperature less than or equal to 500° C. in order to achieve pyrolysis;
   heating at a temperature greater than or equal to 800° C. and less than or equal to 1100° C., such that said binder and the removed portion of said fugitive phase material are burned out of said refractory body; and,
   heating at a temperature at approximately 1200° C. to perform partial densification of said refractory body, or at approximately 1500° C. to perform complete densification of said refractory body, about said porous network voided by the burned out fugitive phase material.

12. The method of claim 1 wherein said fugitive phase material is a polymer, a cellulosic material, or a carbon black material.

13. The method of claim 1 wherein providing a refractory material slurry further comprises providing aluminum oxide to said slurry.

14. A method for controlling porosity in a gas permeable material comprising:

provỉding a refractory ceramic or refractor metal material in powder form;

selecting a carbon black material in powder form as a fugitive phase having a volume percentage of said refractory material;

combining said carbon black material, a binder material, a plasticizer, and a solvent to said refractory material to form a slurry;

processing said slurry to form a resulting refractory body; and, controlling porosity of said resulting refractory body by performing thermal cycling, comprising:

providing an oxidizing atmosphere with respect to said carbon black;

heating at a temperature less than or equal to 500° C. for a first period of time in order to achieve pyrolysis;

heating at a temperature greater than or equal to 800° C. and less than or equal to 1100° C. for a second period of time, wherein said binder material and a portion of said carbon black less than said volume percentage are thermally removed from said refractory body, such that a portion of said carbon black remains; and, heating in a temperature range of 1200° C. to 1500° C. for a third period of time such that said refractory body undergoes complete or partial densification, forming a contiguous porous network of refractory material, wherein the volume of said porous network is approximately equal to or greater than said volume percentage of said carbon black removed and complete or partial densification of said refractory body.

15. A method for controlling porosity in a gas permeable material consisting essentially of:

providing a refractory material slurry;

selecting a fugitive phase material having a volume percentage of said refractory material slurry, wherein said fugitive phase material can be removed during thermal processing;

combining said fugitive phase material with said slurry;

processing the combined slurry into a resultant refractory body; and, controlling porosity of said resultant refractory body by heating for a period of time, thermally removing a portion of said fugitive phase material, less than said volume percentage, from said refractory body, such that a remaining portion of said fugitive phase material remains, to form a contiguous porous network with porosity approximately equal to the volume percentage of the removed portion of said fugitive phase material.

16. The method of claim 15 wherein adding heat for a period of time comprises sintering said refractory body in an atmosphere which is oxidizing with respect to said fugitive phase.

17. The method of claim 16 wherein sintering said refractory material comprises performing a partial densification of said refractory material, such that higher levels of porosity result after heating.

18. The method of claim 15 wherein controlling porosity further comprises performing partial or complete densification of said refractory body about said porous network.

19. The method of claim 15 wherein providing a refractory material slurry comprises providing a refractory material in powder form, a polymeric binder material, a solvent, and a plasticizer.

20. The method of claim 19 wherein sintering said refractory body, comprises:

heating at a temperature less than or equal to 500° C. in order to achieve pyrolysis;

heating at a temperature greater than or equal to 800° C. and less than or equal to 1100° C., such that said binder and the removed portion of said fugitive phase material are burned out of said refractor, body; and, heating at a temperature at approximately 1200° C. to perform partial densification of said refractory body, or at approximately 1500° C. to perform complete densification of said refractory body, about said porous network voided by the burned out fugitive phase material.

* * * * *

UNITED STATES PATENT AND TRADEMARK OFFICE
CERTIFICATE OF CORRECTION

PATENT NO. : 6,015,517
DATED : January 18, 2000
INVENTOR(S) : Casey

It is certified that error appears in the above-identified patent and that said Letters Patent is hereby corrected as shown below:

Col. 4, line 55, delete"50°" and substitute therefore -- 500°--

Col. 9, Line 3, delete "refractor" and substitute therefore -- --refractory-- --

Col. 10, line 34, delete "refractor," and substitute therefore -- --refractory-- --

Signed and Sealed this

Twenty-sixth Day of September, 2000

Attest:

Q. TODD DICKINSON

Attesting Officer

Director of Patents and Trademarks